Patented Mar. 17, 1953

2,632,080

UNITED STATES PATENT OFFICE 2,632,080

WELDING ELECTRODE

Rene D. Wasserman, Stamford, Conn.

No Drawing. Application July 20, 1950,
Serial No. 175,020

1 Claim. (Cl. 219—8)

This invention relates to aluminum welding and more particularly to welding electrodes adapted for use in the arc welding of aluminum.

It is the primary object of the invention to provide a novel electrode which can be satisfactorily and successfully used for welding aluminum by welders of ordinary skill.

Among the outstanding advantages of the novel welding rod are:

(1) Freedom from spatter during the welding operation;

(2) Increased fluidity of the filler metal during welding;

(3) Increased density of the deposit; and (4) Greatly increased tensile strength in the resulting weld as compared with that obtainable when employing previously known welding electrodes.

Other objects and advantages will hereinafter appear.

The novel electrode is desirably a coated electrode having a core which consists principally of aluminum, but which contains also a high proportion of silicon, namely, substantially 7% to 15% by weight. The core, therefore, comprises 85% to 93% aluminum and substantially 7% to 15% silicon. There may also be included small quantities of other metals such as copper, titanium, chromium, zinc, magnesium, iron and nickel.

The flux coating is made to contain one or more fluorides and one or more chlorides, the fluoride content consisting of the fluoride of one or more of the metals of the group which consists of sodium, lithium, potassium, barium, calcium, zinc, tin and cadmium, and the chloride content consisting of the chloride of one or more of the metals of the same group.

It is important that the coating include not less than 15% fluoride and not less than 55% chloride; the ranges, therefore, being fluoride content 15 to 45% and chloride content 55 to 85%.

A typical example of a rod composition which has been found to yield very satisfactory results is: aluminum 85%, silicon 15%, coated with a flux compound as follows: fluoride 30%; chloride 70%.

When the novel coated electrode is placed in the conventional electrode holder, the welding of aluminum is found to be greatly simplified, and is in fact as free from difficulty as the welding of mild steel.

The costly spatter which is a common feature of aluminum welding with conventional electrodes disappears altogether. The fluidity of the weld metal is greatly increased.

The weld deposit is unusually dense and has much higher tensile strength, the tensile strength being of the order of 8,000 pounds per square inch greater than is obtainable with conventional electrodes. In addition to providing an excellent bond, a close color match and good corrosion resistance are obtained.

In speaking herein of conventional electrodes, reference is had to prior electrodes having cores of pure aluminum or of aluminum with a low silicon content, to wit, not more than 5%.

I have described what I believe to be the best embodiments of my invention. I do not wish, however, to be confined to the embodiments shown, but what I desire to cover by Letters Patent is set forth in the appended claim.

I claim:

A coated electrode for welding aluminum having a core which comprises 85% to 93% aluminum by weight and 7% to substantially 15% silicon by weight, and a coating composed of the fluoride of at least one of the metals chosen from the group consisting of sodium, lithium, potassium, barium, calcium, zinc, tin and cadmium, and the chloride of at least one of the metals chosen from the same group, the fluoride content constituting 15 to 45% of the coating, and the chloride content constituting the remainder.

RENE D. WASSERMAN.

REFERENCES CITED

The following references are of record in the file of this patent:

UNITED STATES PATENTS

| Number | Name | Date |
|---|---|---|
| 1,410,461 | Edwards et al. | Mar. 21, 1922 |
| 1,763,417 | Clarke | June 10, 1930 |
| 1,920,262 | Kempf et al. | Aug. 1, 1933 |
| 1,946,958 | Anastasiadis | Feb. 13, 1934 |
| 1,947,121 | Bonsack | Feb. 13, 1934 |
| 2,112,578 | Rohrig | Mar. 29, 1938 |
| 2,325,014 | Prendergast et al. | July 20, 1943 |
| 2,337,714 | Haim et al. | Dec. 28, 1943 |
| 2,480,498 | Miller et al. | Aug. 30, 1949 |

FOREIGN PATENTS

| Number | Country | Date |
|---|---|---|
| 240,411 | Great Britain | July 8, 1926 |
| 285,674 | Great Britain | Feb. 23, 1928 |